United States Patent [19]

Tsushima et al.

[11] Patent Number: 4,673,878
[45] Date of Patent: Jun. 16, 1987

[54] VEHICLE LOCATION DISPLAY DEVICE WITH AVERAGING MEANS FOR CORRECTING LOCATION INFORMATION

[75] Inventors: Noburu Tsushima, Morioka; Masashi Fuse, Tamayama; Teruo Mimori; Toshio Sasaki, both of Yokohama; Tadashi Mukai, Tokyo, all of Japan

[73] Assignee: Alps Electric Co., Ltd., Japan

[21] Appl. No.: 824,309

[22] Filed: Jan. 30, 1986

Related U.S. Application Data

[63] Continuation of Ser. No. 472,059, Mar. 4, 1983, abandoned.

[30] Foreign Application Priority Data

Mar. 5, 1982 [JP] Japan .................................. 57-34621

[51] Int. Cl.⁴ ...................... G01C 17/28; G01G 7/28; G01R 33/00
[52] U.S. Cl. .................................. 324/226; 324/247; 324/260; 33/361; 364/444; 364/449
[58] Field of Search ............... 324/207, 208, 244, 247, 324/253, 260, 226; 33/357, 361; 364/449, 436, 444; 340/995, 988; 343/450, 451, 457

[56] References Cited

U.S. PATENT DOCUMENTS 3,835,375 9/1974 Rovner .................................. 324/247
4,435,760 3/1984 Kuno et al. .......................... 340/988

Primary Examiner—Ernest F. Karlsen
Assistant Examiner—Walter E. Snow
Attorney, Agent, or Firm—Guy W. Shoup

[57] ABSTRACT

A current location updating display for indicating the current location of moving members such as an automobile while updating from time to time based on output from a magnetic azimuth sensor adapted to detect the azimuth of terrestrial magnetism. Output signals from the magnetic azimuth sensor are stored in a data memory after A/D conversion and correction, and a predetermined amount of data read out from the data memory is subject to the averaging processing. With this, plural angle information (sin $\theta$ and cos $\theta$) signals or plural angle ($\theta$) signals are averaged out including a signal corresponding to disturbance magnetism. Thus average data signals are integrated by an integrator and then sent to a display portion. Through the averaging processing an azimuthal error is restrained as small as possible, so that the current location or running path of the moving member may be indicated correctly.

2 Claims, 14 Drawing Figures

VEHICLE LOCATION DISPLAY DEVICE WITH AVERAGING MEANS FOR CORRECTING LOCATION INFORMATION

This is a continuation application from application Ser. No. 472,059 filed Mar. 4, 1983 now abandoned.

FIELD OF THE INVENTION

This invention relates to a current location updating display for moving members, and more particularly to a current location updating display for indicating the current location of moving members such as an automobile while updating based on output from a magnetic azimuth sensor adapted to detect the azimuth of terrestrial magnetism, wherein an influence of the magnetic disturbance is restrained thereby to indicate the current position or running path of the moving member as correct as possible.

BACKGROUND OF THE INVENTION

Heretofore, it has been proposed to indicate the current location of moving members while updating, which location is varied from time to time, based on output from a magnetic azimuth sensor adapted to detect the azimuth of terrestrial magnetism. FIG. 1 shows a block-diagram of one of the conventional current location updating displays. In the figure, a magnetic azimuth sensor 1 detects the azimuth of terrestrial magnetism and outputs after conversion into the following bi-directional electric signals along the X-axis and Y-axis orthogonal to each other, as shown in FIG. 2;

$$V_X = KH \sin\theta \\ V_Y = KH \cos\theta \quad (1)$$

where K is a constant, H is the strength of terrestrial magnetism, and $\theta$ is an angle which represents the running direction of a moving member with respect to the azimuth of terrestrial magnetism. The positive direction of the Y-axis in FIG. 2 is made coincident with the running direction of the moving member. As will be easily seen from the equation (1), a locus given by the output signals ($V_X$, $V_Y$) from the magnetic azimuth sensor 1 assumes a circle $l_1$ as shown in FIG. 3, which is represented by the following equation;

$$V_X^2 + V_Y^2 = |KH|^2 = a^2 \quad (2)$$

A vector $\overline{OP}$ shown in FIG. 3 is a unit vector which represents the azimuth corresponding to a terrestrial magnetic vector H. When this unit vector is normalized to an azimuth vector of magnitude 1, the azimuth vector can be represented using $\sin\theta$ and $\cos\theta$ given by the following equations (3) and (4):

$$\sin\theta = V_X / \sqrt{V_X^2 + V_Y^2} \quad (3)$$

$$\cos\theta = V_Y / \sqrt{V_X^2 + V_Y^2} \quad (4)$$

In FIG. 1, the reference numerals 2 and 3 designate A/D converters for converting the output signals from the magnetic azimuth sensor 1 into digital signals, and the numerals 4 and 5 designate offset/sensitivity correcting circuits each for imparting the predetermined offset/sensitivity correction to an output signal from the A/D converter. An absolute value circuit 6 is to calculate the value of $\sqrt{V'_X{}^2 + V'_Y{}^2}$ based on corrected output signals $V'_X$, $V'_Y$ from the offset/sensitivity correcting circuits 4 and 5. Designated at the numeral 7 is an angle information generating circuit in which a sin generating circuit 8a is to calculate the value of $\sin\theta$ given by the equation (3), while a cos generating circuit 8b is to calculate the value of $\cos\theta$ given by the equation (4). A speed sensor 9 is to generate a pulse signal each when the moving member travels over a predetermined distance $\Delta d$, and an integrator 10 is to integrate the values of $\sin\theta$ and $\cos\theta$, respectively, each when it receives a pulse signal from the speed sensor 9. For example, when the n-th pulse signal is input to the integrator 10, it outputs the integrated values of $$\sum_{}^{n} \sin\theta_n \text{ and } \sum_{}^{n} \cos\theta_n.$$

Moreover, a display portion 11 is to indicate the current location of the moving member by multiplying the contents of the integrator 10 by a predetermined coefficient $\Delta d$.

Hereinafter, operation of the current location updating display as shown in FIG. 1 will be described in connection with FIG. 4. In the figure a point $P_0$ is a starting point of the moving member, and $l_2$ represents a running path thereof. The positive direction of the y-axis in FIG. 4 is made coincident with the direction of terrestrial magnetism. When the first pulse signal is generated from the speed sensor 9, the moving member runs at the point $P_1$ whose coordinates ($x_1$, $y_1$) are represented as follows;

$$x_1 = \Delta d \sin\theta_1 \\ y_1 = \Delta d \cos\theta_1 \quad (5)$$

At this time, since the contents of the integrator are given by $\sin\theta_1$ and $\cos\theta_1$ as previously noted, the point $P_1$ can be indicated on a screen of the display portion 11 by multiplying the contents read out from the integrator 10 by the unit moving distance $\Delta d$ of the moving member. In a similar manner, respective locations $P_2$, $P_3$, ... of the moving member when the speed sensor 5 outputs 2nd, 3rd, ... pulse signal, are indicated on the screen of the display portion 11 in sequence. Then, coordinates ($x_n$, $y_n$) of a point $P_n$ which shows the location of the moving member when the n-th pulse signal is generated, are also indicated on the display portion 11 similarly based on the following equations;

$$x_n = \Delta d \sum_{}^{n} \sin\theta_n \\ y_n = \Delta d \sum_{}^{n} \cos\theta_n$$

In this way, the current location of the moving member under traveling can be updated one after another, and it is also possible to display a running path of the moving member with ease.

However, as shown in FIG. 5(a), an iron material 13 is buried at each joint of the surface of roads such as express highways or multi-level crossing roads frequently. In the figure, the reference numeral 12 denotes a road surface and the numeral 14 denotes a moving member. And the iron material 13 is basically magnetized in the lengthwise direction thereof. Thus, when the moving member 14 passes over the iron material 13, the magnetic azimuth sensor 1 detects a resultant vector 17 which is resulted from a terrestrial magnetic vector 15 and a disturbance magnetic vector 16 due to magnetization of the iron material 13, and assumes an angle $\alpha$ with respect to the terrestrial magnetic vector 15, as shown in FIG. 5(b). In the case of FIG. 5(a), therefore, although an azimuth to be displayed on the display portion 11 when the moving member 14 passes over the iron material 13 must be coincident with an azimuth 18 indicated by a dotted line in FIG. 5(c) in truth, an azimuth 19 indicated by a solid line is displayed thereon erroneously. Furthermore, if the moving member (not shown) travels on the road surface 12 as shown in FIG. 6(a) in the direction of an arrow, for example, it will suffer an influence of disturbance magnetism caused by the iron materials 13 also at both points $P_2$ and $P_4$. Consequently, the conventional current location updating display has such a disadvantage in its display function that if the azimuth vector is casually sampled at a position of the buried iron material 13, the displayed course $P_0\text{-}P_1\text{-}P_2'\text{-}P_3'\text{-}P_4'$ indicated by solid lines will become quite different from the true course $P_0\text{-}P_1\text{-}P_2 \ldots$ indicated by dotted lines, as shown in FIG. 6(b).

Moreover, when there exist disturbance magnetic vectors 20 and 21 with respect to the terrestrial magnetic vector 15 as shown in FIG. 7, this leads to such a disadvantage that the resultant vectors are oscillated to right and left as indicated by vectors 22 and 23 and hence, a locus of the respective current locations becomes zigzag.

SUMMARY OF THE INVENTION

This invention has been accomplished with a view of overcoming the foregoing disadvantages in the art. It is an object of the invention to provide a current location updating display for moving members in which when indicating the current location of the moving member based on magnetic information detected by a magnetic azimuth sensor, such magnetic information as including also magnetism other than terrestrial magnetism among the detected magnetic information are subject to the averaging processing, thereby to indicate the current location or running path of the moving as correct as possible.

BRIEF DESCRIPTION OF THE DRAWINGS

By way of example only, certain embodiments of the invention will now be described with reference to the accompanying drawings in which.

DETAILED DESCRIPTION OF THE INVENTION

Figure 8A:
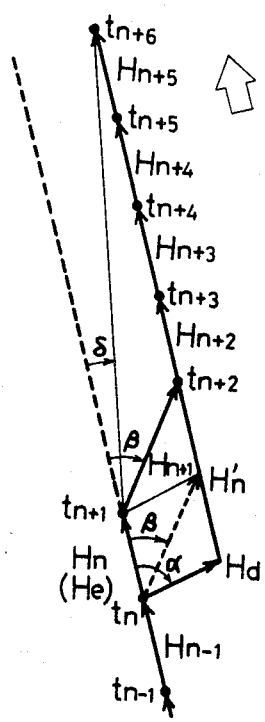
FIGS. 8(a) and 8(b) is a vector diagram for explaining the principle of the current location updating display according to this invention.

Referring to FIG. 8, the running direction of the moving member is coincident with the direction of magnetic north, and times $t_{n-1}, t_n, \ldots, t_{n+6}$ designate each time when the output signal from the magnetic azimuth sensor is sampled. When there occurs a disturbance magnetic vector $H_d$ with declination $\alpha$ at the time $t_n$, a terrestrial magnetic vector $H_e$ (coincident with Hn in this case) is combined with the disturbance magnetic vector $H_d$ and hence, an azimuth vector $H_n'$ deviated from the true running direction by declination $\beta$ is detected by the conventional display, as shown by FIG. 8(a). As a result, the displayed course is coincident with the true running location up to the azimuth vector Hn at the time $t_n$, but an azimuth vector $H_{n+1}$ indicated at the time $t_{n+1}$ is given by the resultant azimuth vector $H_n'$ which is obtained through a period between the time $t_n$ and $t_{n+1}$. Thereafter, the displayed azimuth vectors are made deviated from the respective true running locations corresponding to the resultant azimuth vector $H_n'$.

Figure 8B:
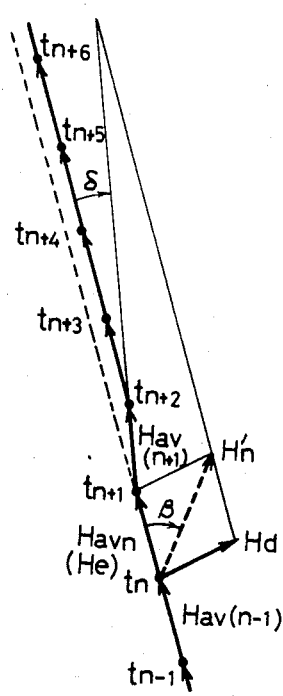

FIG. 8(b) is a vector diagram showing the principle of this invention by referring to the same case as FIG. 8(a) that there occurs the disturbance magnetic vector $H_d$ at the time $t_n$. As will be seen from the figure, the disturbance magnetic vector $H_d$ occured at the time $t_n$ is subject to the averaging processing together with the previous azimuth vectors, so that an azimuthal error is made small. More specifically, an average azimuthal vector $H_{av}$ is generally represented as follows:

$$H_{av} = \frac{H_{l+1} + H_{l+2} + \ldots + H_{l+m}}{m} \quad (6)$$

In the case of m=5 in the equation (6), there come under the averaging processing at the time $t_{n+1}$ shown in FIG. 8(b) average azimuthal vectors $H_{av(n-1)}$, $H_{av(n-2)}$, $H_{av(n-3)}$ and $H_{av(n-4)}$ at the respective previous times $t_{n-1}, t_{n-2}, t_{n-3}$ and $t_{n-4}$ as well as the resultant vector $H_n'$ from the disturbance magnetic vector $H_d$ occurred at the time $t_n$ and the terrestrial magnetic vector $H_e(H_{avn})$. That is, an average azimuthal vector $H_{av(n+1)}$ to be calculated at the time $t_{n+1}$ is given as follows;

$$H_{av(n+1)} = \frac{H_n' + H_{av(n-1)} + H_{av(n-2)} + H_{av(n-3)} + H_{av(n-4)}}{5} \quad (7)$$

$$H_n' = H_e(H_{avn}) + H_d \quad (8)$$

Besides, FIG. 8 illustrates the case that the moving member travels straightly toward the magnetic north and the disturbance magnetic vector $H_d$ occurs only at the time $t_n$.

It will be understood from the equations (7) and (8) that a declination $\delta$ of the average azimuthal vector $H_{av(n+1)}$ is smaller than the declination $\beta$ of the resultant azimuth vector $H_n'$ and hence an azimuthal error can be made smaller.

Figure 1:
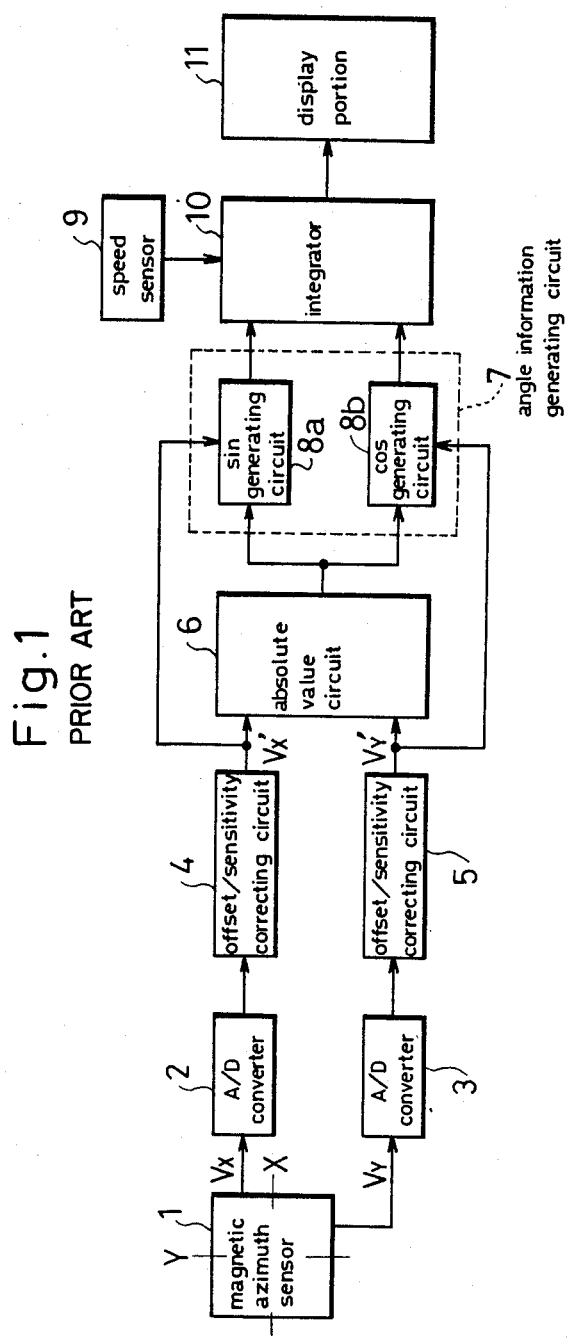
FIG. 1 is a block diagram showing a typical constitution of the conventional current location updating display.
Figure 2:
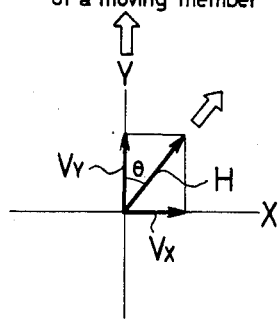
FIGS. 2 to 7 are explanatory views for explaining the principle of operation of the display shown in FIG. 1.
Figure 3:
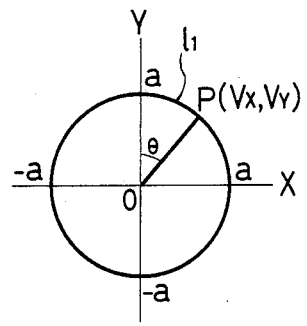
Figure 4:
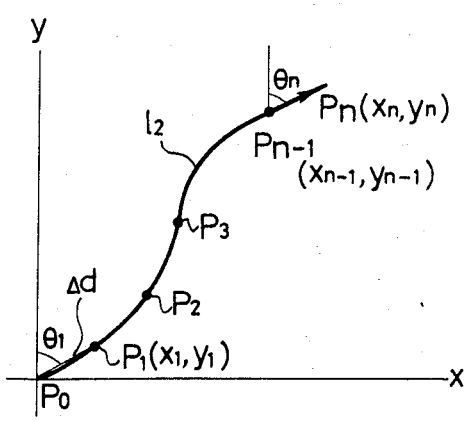
Figure 5A:
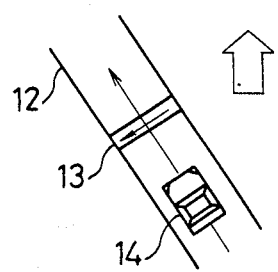
Figure 5B:
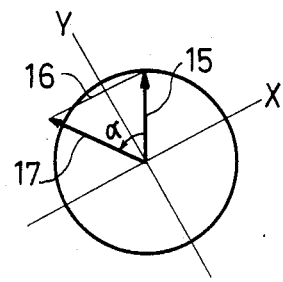
Figure 5C:
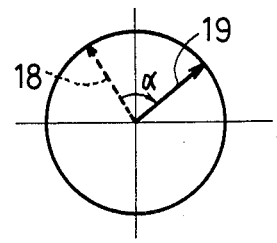
Figure 6A:
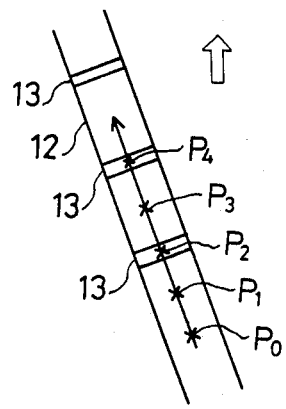
Figure 6B:
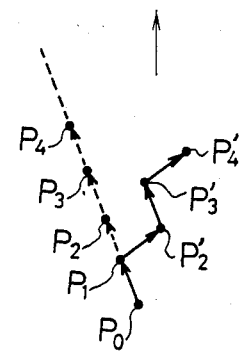
Figure 7:
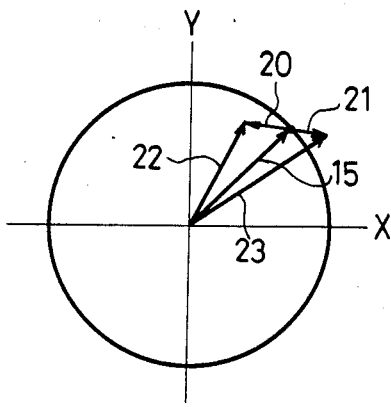
Figure 9:
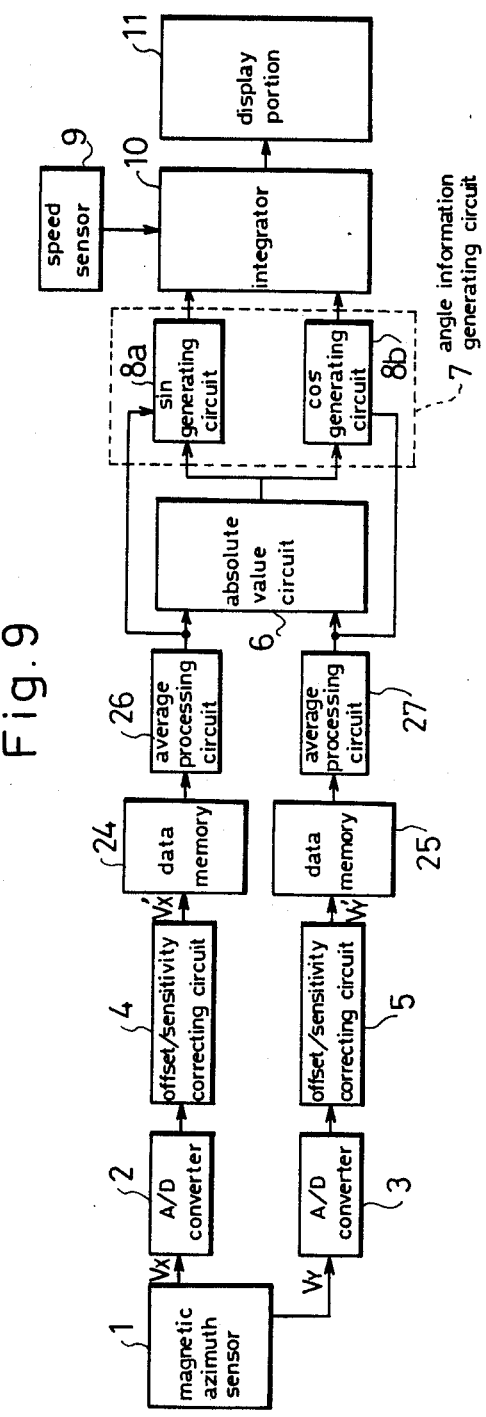
FIGS. 9 and 10 are block diagrams showing preferred embodiments of the current location updating display according to this invention.

Now referring to FIG. 9, similarly to the conventional display shown in FIG. 1 the output signals $V_X$ and $V_Y$ from the magnetic azimuth sensor 1 are supplied via the A/D converters 2 and 3 to the offset/sensitivity correcting circuits 4 and 5, from which the corrected output signals $V_X'$ and $V_Y'$ are output. Predetermined amounts of the corrected output signals $V_X'$ and $V_Y'$ are stored in data memories 24 and 25 at all times, respectively, corresponding to the preset memory capacity thereof, and the oldest data among those being stored in the data memories 24 and 25 are cleared sequentially each when new data are input thereto. Then, the data stored in the data memories 24 and 25 are averaged out in average processing circuits 26 and 27, respectively. For example, now assuming that the preset memory capacity of the data memories 24 and 25 is k, the average processing circuits 26 and 27 carry out the processing as follows;

$$\overline{V}_{X'} = \frac{\sum\limits^{k} V_{X+k}}{k}$$

$$\overline{V}_{Y'} = \frac{\sum\limits^{k} V_{Y+k}}{k}$$

The averaged singals ($\overline{V}_{X'}$) and ($\overline{V}_{Y'}$) are fed to the absolute value circuit 6 and then to the angle information generating circuit 7. and calculation of $\sqrt{(\overline{V}_{X'})^2 + (\overline{V}_{Y'})^2}$ is performed in the absolute value circuit 6. Thereafter, the similar processing to that in FIG. 1 is run through the angle information generating circuit 7, integrator 10 and the speed sensor 9, and then the running path of the moving member is indicated on the display portion 11.

Figure 10:
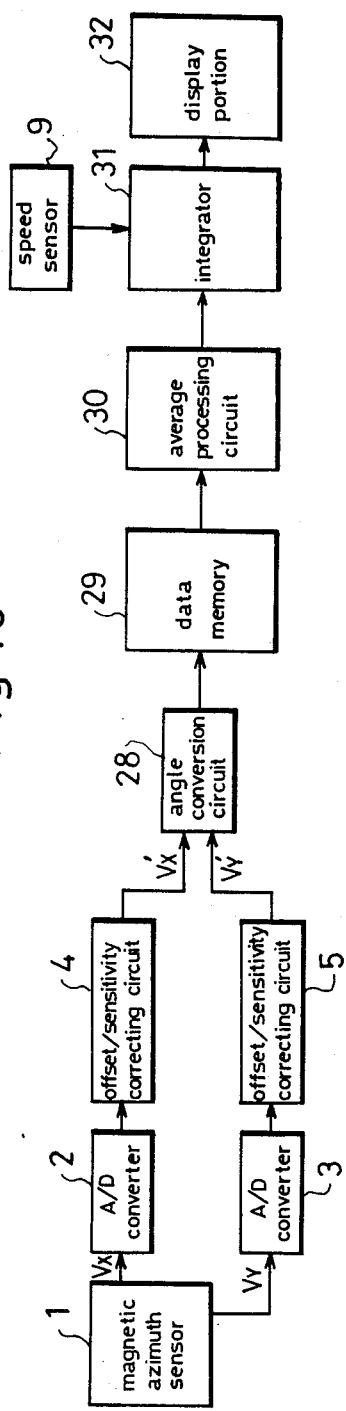

FIG. 10 shows another embodiment of this invention. In this embodiment, after the signal processing similar to that in the conventional art shown in FIG. 1, the corrected output signals $V_{x'}$, $V_{Y'}$ from the offset/sensitivity correcting circuits 4 and 5 are input to an angle conversion circuit 28 through which the X-axis component and Y-axis component are converted into an angle, thereafter the averaging processing is performed.

More specifically, the corrected output signals $V_{X'}$, $V_{Y'}$ from the offset/sensitivity correcting circuits 4 and 5 are input to the angle conversion circuit 28, in which the following arithmetic processing is run, thereby to obtain an angle $\theta$;

$$\theta = \tan^{-1}\frac{V_{Y'}}{V_{X'}}$$

Thus obtained angle $\theta$ through the angle conversion circuit 28 is input to a data memory 29, so that a predetermined amount of data is stored therein corresponding to the preset memory capacity. Each when new data are input to the data memory 29 and the amount of stored data exceeds the preset memory capacity thereof, the oldest data are cleared and at the same time, data signals in the number of p corresponding to the preset memory capacity are read out from the data memory 29 into an average processing circuit 30, in which the following arithmetic processing is run so as to obtain an average azimuth angle $\overline{\theta}$;

$$\overline{\theta} = \frac{\sum\limits^{p} \theta_p}{p}$$

Then, thus obtained $\overline{\theta}$ is input to an integrator 31 in which the integration processing of $$\sum\limits^{n} e^{i\theta n}$$

is run, for example, when the n-th pulse signal is fed from the speed sensor 9 thereto. Consequently, the current location of the moving member is indicated on a display portion 32 by multiplying the content of the integrator 31 by a predetermined constant r, i.e., based on $$r \sum\limits^{n} e^{i\theta n}.$$

In the above description, iron materials buried in the road surface were cited as an examplified source which generates disturbance magnetism, but other steel-frame structures used for tunnels, brigdes, etc. may become a source of disturbance magnetism. In this case, an influence of the disturbance magnetism can be also prevented in a similar manner.

Although there have been described what are present considered to be the preferred embodiments of the invention, it will be understood that the present invention may be embodied in other specific forms without departing from the spirit or essential characteristics thereof.

What is claimed is:

1. In a current location updating display for a moving member which comprises at least: a magnetic azimuth sensor for detecting local azimuth values of the external magnetic field including terrestrial magnetism at a series of locations traversed by the moving member; a speed sensor for generating sequential pulses indicating incremental distances traversed for the series of locations in accordance with a running speed of said moving member; and a display portion for indicating the series of locations (course locus) traversed by said moving member based on a series of incremental vectors obtained by the incremental distances indicated by said speed sensor and the local azimuth values indicated by said magnetic azimuth sensor, while updating from time to time, the improvement comprising:

an A/D converter for converting analog output signals from said magnetic azimuth sensor into sequential digital signals representing azimuth data for a series of locations traversed by said moving member;

an offset/sensitivity correcting circuit for imparting a predetermined correction amount to output signals from said A/D converter;

a data memory for storing corrected digital azimuth signals from said offset/sensitivity correcting circuit for said series of locations;

an average processing circuit for averaging the digital azimuth signal for each location with those of a predetermined number of previous locations of said moving member read out from said data memory and providing an averaged azimuth signal for each location;

an absolute value circuit for calculating the absolute value of the averaged azimuth signal from said average processing circuit;

an angle information generating circuit for generating an azimuth vector based on both output signals from said absolute value circuit and said average processing circuit;

an integrator for integrating outputs from said angle information generating circuit in accordance with the output pulses from said speed sensor; and said display portion thereby indicating a series of incremental vectors comprising the course locus based on said averaged azimuth values for the locations traversed by said moving member in accordance with the content of said integrator, whereby said averaged azimuth values are used to minimize azimuth errors in said incremental vectors of the course locus due to any local magnetic disturbances detected by the magnetic azimuth sensor.

2. In a current location updating display for a moving member which comprises at least: a magnetic azimuth sensor for detecting local azimuth values of the external magnetic field including terrestial magnetism at a series of locations traversed by the moving member; a speed sensor for generating sequential pulses indicating incremental distances traversed for the series of locations in accordance with a running speed of said moving member; and a display portion for indicating the series of locations (course locus) traversed by said moving member based on a series of incremental vectors obtained by the incremental distances indicated by said speed sensor and the local azimuth values indicated by said magnetic azimuth sensor, while updating from time to time, the improvement comprising:

an A/D converter for converting analog output signals from said magnetic azimuth sensor into sequential digital signals representing azimuth data for a series of locations traversed by said moving member;

an offset/sensitivity correcting circuit for imparting a predetermined correction amount to output signals from said A/D converter;

an angle conversion circuit for converting corrected digital azimuth signals from said offset/sensitivity correcting circuit into angle signals;

a data memory for storing said angle signals from said angle conversion circuit for said series of locations;

an average processing circuit for averaging the angle signal for each location with those of a predetermined number of previous locations of said moving member read out from said data memory and providing an averaged angle signal for each location;

an integrator for integrating the averaged angle signals from said average processing circuit in accordance with the output pulses from said speed sensor; and said display portion thereby indicating a series of incremental vectors comprising the course locus based on said averaged azimuth values for the locations traversed by said moving member in accordance with the content of said integrator, whereby said averaged azimuth values are used to minimize azimuth errors in said incremental vectors of the course locus due to any local magnetic disturbances detected by the magnetic azimuth sensor.

* * * * *